UNITED STATES PATENT OFFICE.

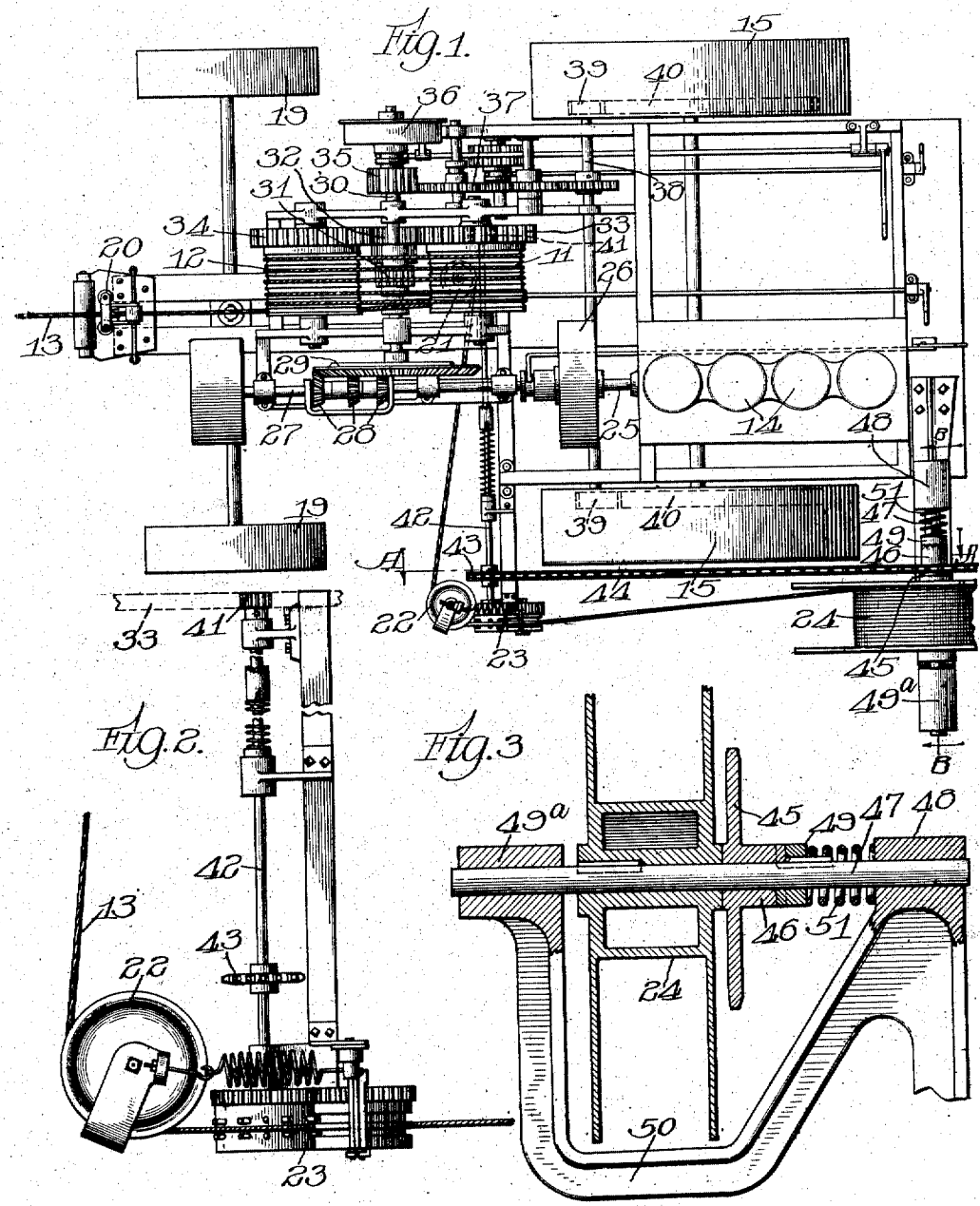

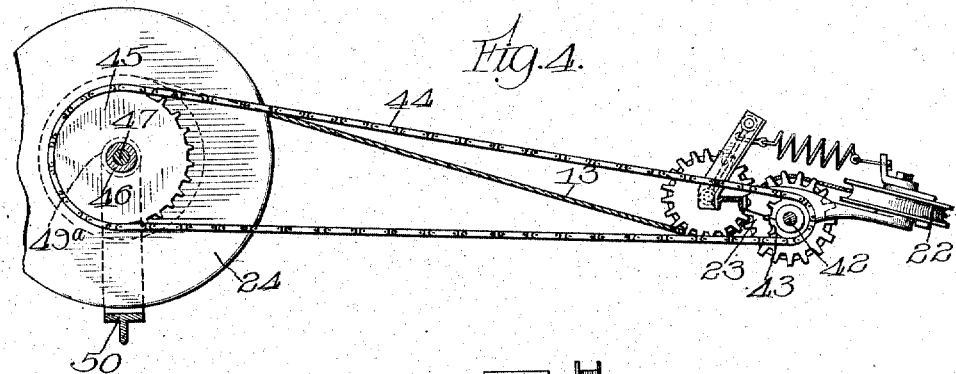
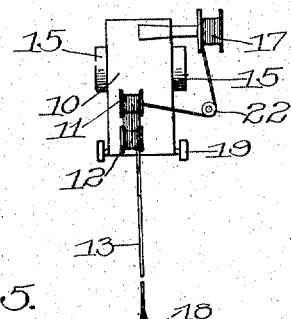

CLYDE J. EASTMAN, OF LOS ANGELES, CALIFORNIA.

CABLE-TRACTION APPARATUS.

980,220.

Specification of Letters Patent.  Patented Jan. 3, 1911.

Application filed June 29, 1910. Serial No. 569,452.

*To all whom it may concern:*

Be it known that I, CLYDE J. EASTMAN, a citizen of the United States, and a resident of Los Angeles, in the county of Los Angeles and State of California, have invented certain new and useful Improvements in Cable-Traction Apparatus, of which the following is a full, clear, and exact specification.

My invention is mainly concerned with cable traction apparatus in which two engine units are employed, one at each end of the field, and a cable to which the plows, etc., are attached, which cable is drawn across the field by winding it onto a drum carried by one unit, while it is simultaneously unwound from a drum carried by the other unit, although it might be employed in connection with an apparatus of the general type shown in my Patents, No. 681,632, granted August 27, 1901, and No. 900,060, granted September 29, 1908, for reeling up the cable when a field is completed and the apparatus is to be removed.

In devices of the two-unit class above described, so far as I am aware, prior to my invention, it has been the practice to apply the power for winding up the cable directly to the reel upon which the cable is being wound, with the result that the power required in the engine varied from a comparatively small amount when the reel was practically empty, to a comparatively large amount when the reel was practically full, as it will be obvious that the effective ratio of the power as applied diminishes steadily as the reel is filled and its effective diameter is increased. This arrangement necessitated the employment of engines having an unnecessarily large horsepower during most of the time, if they were not in danger of being stalled as the end of the winding approached. It was further open to the objection that the wear on the cables was unnecessarily great on account of the great strain that was applied to the reel toward the end of the winding. Moreover, the cable was liable to be wound irregularly on the reel, and as a consequence it would slip when the strain became very great, through sudden strains and jars on the apparatus, which was very destructive to the life of the cables and apparatus. To obviate all these objections, instead of applying the main traction power to the cable through the reels upon which it is stored, I employ winding drums, such as are shown in my aforesaid patents, through which drums the cable is drawn, and then wound upon a reel by the application thereto of only the necessary power to wind up the cable as it is fed through the drums.

To illustrate my invention, I annex hereto two sheets of drawings, in which the same reference characters are used to designate identical parts in all the figures, of which,—

Figure 1 is a top plan view of one engine unit of my apparatus equipped with the reel, which may be used as one of the two engine units where the cable is to be drawn back and forth across the field, or which might be used to be drawn back and forth across the field upon the cable, which in this case is stationary, as in my aforesaid Patents, Nos. 681,632 and 900,060; Fig. 2 is a plan view showing the reel-driving connections on a larger scale; Fig. 3 is an enlarged detail in section on the line B—B of Fig. 1; Fig. 4 is a side elevation of said driving connections, as seen on line A—A of Fig. 1; and Fig. 5 is a diagrammatic view illustrating two units connected by a cable, showing how they are used in the preferred system.

Referring first to Fig. 5, I employ at each end of the field a cable-winding apparatus, which preferably consists of running gears 10 having a pair of sheaves 11 and 12 around which the cable 13 is adapted to be wound by driving the drums from some suitable power, such as an engine 14 carried by the apparatus, and illustrated in Fig. 1, but omitted from the diagrammatic view under consideration. I preferably provide the running gears with a pair of traction wheels 15, to which the engine can be coupled, so that its position at the end of the field can be changed as is desirable between each passage of the plows or other agricultural apparatus 16 across the field. The cable is drawn from one unit to the other, being drawn around the drums 11 and 12 of one unit and wound upon the associated reel 17, while it is at the same time being unwound from the reel of the other unit and drawn about its drums 11 and 12. The plows or other implements 16 are preferably arranged so that they can be operated in either direction, so that they do not have to be turned around at the end of the field, but I might, if desired, employ the couplings 18 adjacent the plows, as indicated in dotted lines in Fig. 4.

Referring now to Figs. 1, 2, 3 and 4, in which suitable apparatus is illustrated more in detail, the traction wheels 15 and the steering wheels 19 may be employed to support the general framework of the machine in any desired manner, and at the front of the machine, where the cable 13 is received, I provide suitable tension apparatus 20, over which the cable is drawn as it passes to the drum 11, around one groove of which it passes to the drum 12, around one groove of which it passes back to the drum 11, and so on, until as many loops are taken in the cable as are necessary to provide the necessary grip of the drums on the cable. The cable passes from the drum 12 around a guiding sheave 21, shown in dotted lines in Fig. 1, to the guiding sheave 22, by which it is directed to the tension and laying-down roller mechanism 23, through which it passes to the reel 24. The engine shaft 25 is coupled or uncoupled, as desired, by means of a clutch 26 to the shaft 27, which may be connected by the bevel gear pinions 28 with a bevel gear wheel 29 so as to vary the speed at which the shaft 30, on which the bevel gear wheel is secured, is driven. The shaft 30 has splined thereon a gear pinion 31, which can be slid by suitable mechanism into and out of operative engagement with a gear pinion 32, which meshes with gear wheels 33 and 34 secured to the drums 11 and 12, respectively, so that when desired the drums may be driven from the engine 14. To drive the traction wheels in moving the engine at the end of the field, I provide the gear pinion 35, which can be operatively connected to the shaft 30 upon which it is mounted by means of the clutch 36. A train of gearing 37 extends from the gear pinion 35 to the shaft 38 which carries the pinions 39 meshing with spur gear wheels 40 secured on the traction wheel 15 to drive the same in the customary manner.

The general construction and connections thus far described are shown as substantially the same as those of my Patent No. 938,655, dated November 2, 1909, and reference is made to the aforesaid patent for details, if such information is desired.

The tension and laying-down roller mechanism is preferably driven by means of a spur gear pinion 41, indicated in dotted lines in Fig. 1, on the under side of the spur gear wheel 33 and meshing therewith, and secured on the shaft 42, which is journaled in suitable bearings and extends to the tension and laying-down mechanism 23, which it operates. At a convenient point, this shaft 42 has secured thereon the sprocket wheel 43, which is connected by the sprocket chain 44 with a sprocket wheel 45, which is secured on the sleeve 46 mounted adjacent th reel 24, which is secured on a shaft 47 suitably journaled in the bearings 48 and 49 in the arm 50 extending from the rear of the machine back of one of the traction wheels 15. The sleeve 46 has formed on its inner end a series of beveled slip-clutch teeth which coöperate with a corresponding set of teeth on the coöperating clutch member 49 splined on the shaft 47 and held in engagement with the sleeve 46 by means of the powerful helically-coiled expanding-spring 51 surrounding the shaft 47 and interposed between the sleeve 46 and the bearing 48. The ratio of the drums 11 and 12 and the smallest diameter of the reel 24 and of the sprocket wheels 43 and 45 is such that when the reel is empty, the reel is driven just fast enough to reel up the cable as it passes around the drums, but of course it will be understood that as the layers of the cable on the reel increase, it will tend to wind the cable up faster than it is drawn around the drums, and for this purpose the slip clutch between the members 46 and 49 is provided, as it will be apparent that if the reel tends to draw the cable up faster than it is delivered by the drums, the resistance will cause the two clutch members to separate and allow the necessary slip. When the cable is to be unwound from one unit, the drums are unclutched and the pull of the cable on the other unit causes it to be drawn through the non-operating unit in a manner that will be readily apparent.

As before suggested, the drum may be added to the structure of my aforesaid Patent No. 938,655, and used to wind up the cable after a field has been completed.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a cable traction apparatus, the combination with cable traction drums, of a reel associated therewith, and driving mechanism for said drums and reel, said mechanism serving to drive the reel at a variable speed as compared with the speed of the drums so as to wind the cable evenly on the reel despite its increasing effective diameter.

2. In a cable traction apparatus, the combination with cable traction drums, of a reel associated therewith, driving mechanism for said drums and reel, and slip connections between said driving mechanism and reel.

3. In a cable traction apparatus, the combination with cable traction drums, of a reel associated therewith, means for driving said drums, and driving connections between said drums and reel.

4. In a cable traction apparatus, the combination with cable traction drums, of a reel associated therewith, means for driving said drums, and driving connections between said drums and reel, said connections including a slip clutch.

5. In a cable traction apparatus, the combination with cable traction drums, of a reel associated therewith, a cable adapted to be drawn through the drums and wound upon the reel, and driving mechanism for said drums and reel.

6. In a cable traction apparatus, the combination with cable traction drums, of a reel associated therewith, a cable adapted to be drawn through the drums and wound upon the reel, driving mechanism for said drums and reel, and slip connections between said driving mechanism and reel.

7. In a cable traction apparatus, the combination with cable traction drums, of a reel associated therewith, a cable adapted to be drawn through the drums and wound upon the reel, means for driving said drums, and driving connections between said drums and reel.

8. In a cable traction apparatus, the combination with cable traction drums, of a reel associated therewith, a cable adapted to be drawn through the drums and wound upon the reel, means for driving said drums, and driving connections between said drums and reel, said connections including a slip clutch.

9. In a cable traction apparatus, the combination with a pair of separated units each comprising cable traction drums, a reel associated therewith, and driving mechanism for said drums and reel, of a cable adapted to be drawn by the drums of one unit off of the reel of the other unit and wound on its own reel.

10. In a cable traction apparatus, the combination with a pair of separated units, each unit comprising cable traction drums, a reel associated therewith, means for driving said drums, and driving connections between said drums and reel, of a cable adapted to be drawn by the drums of one unit off of the other reel and wound on its own reel.

11. In a cable traction apparatus, the combination with a pair of separated units each comprising cable traction drums, a reel associated therewith, driving mechanism for said drums and reel, and slip connections between said driving mechanism and reel, of a cable adapted to be drawn by the drums of one unit off of the reel of the other unit and wound on its own reel.

12. In a cable traction apparatus, the combination with a pair of separated units, each comprising cable traction drums, a reel associated therewith, means for driving said drums, and driving connections between said drums and reels, said connections including a slip clutch, of a cable adapted to be drawn by the drums of one unit off of the reel of the other unit and wound upon its own reel.

In witness whereof, I have hereunto set my hand and affixed my seal this 21st day of June A. D. 1910.

CLYDE J. EASTMAN. [L. S.]

Witnesses:
R. D. VERCLER,
C. G. JONES.